March 16, 1954    H. R. GARDNER    2,672,061
ADJUSTABLE BRAKE CONTROL
Filed Jan. 31, 1952    2 Sheets-Sheet 1

INVENTOR.
Harold Rex Gardner
BY Peter Haberlin
ATTORNEY

March 16, 1954  H. R. GARDNER  2,672,061
ADJUSTABLE BRAKE CONTROL
Filed Jan. 31, 1952  2 Sheets-Sheet 2
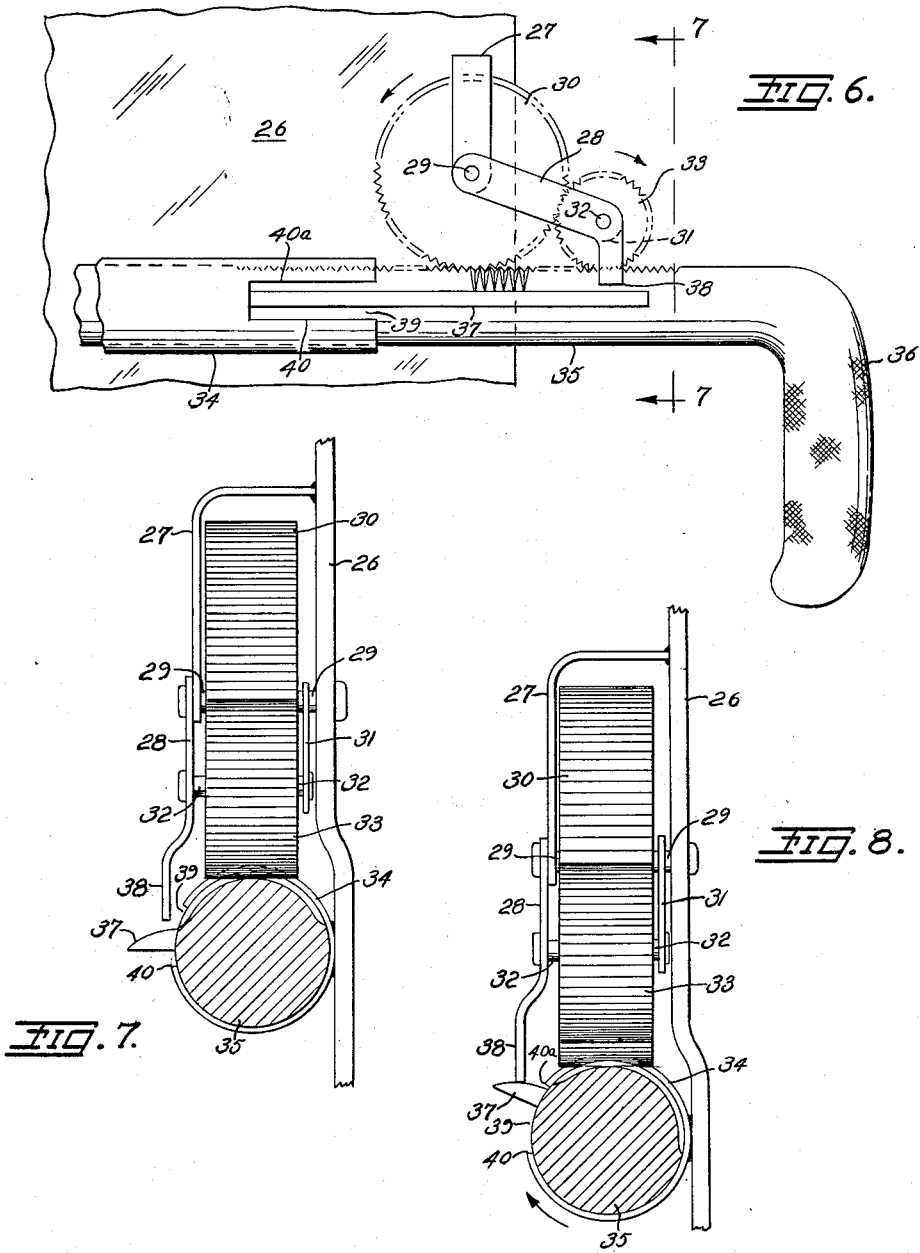
INVENTOR.
Harold Rex Gardner
BY Peter Haberlin
ATTORNEY Patented Mar. 16, 1954

2,672,061

UNITED STATES PATENT OFFICE 2,672,061

ADJUSTABLE BRAKE CONTROL

Harold Rex Gardner, Toutle, Wash.

Application January 31, 1952, Serial No. 269,230

5 Claims. (Cl. 74—530)

This invention relates to adjustable brake controls, but more particularly to a construction of brake control that is applicable to log hauling tractors, auto-trucks and devices for lifting loads.

In this mechanism pointed teeth are used on the gears, since applicant finds that with this form of tooth a finer and closer adjustment may be made with a minimum of effort and time of the operation.

Applicant is aware of the fact that brakes and controlling and adjusting mechanisms have been produced prior to his invention, but considers the present application to have sufficient novelty over the present state of the art to support this application.

One object of this invention is to provide a controlling mechanism operated by double meshing gears, levers and cranks, so arranged that positive and accurate adjustments may be made in releasing and stopping any machine to which these controls are attached.

Another object is to provide a circular gear and pinion to co-act with gear teeth on either arcuate or straight racks.

A further object is to provide a series of levers and cranks to lock and release the circular gears relative to the racks at the will of the operator.

A still further object is to provide means for disengaging the pinion from the rack while adjustment is being made relative to the gear and rack and again to return said pinion into engagement with the rack for the purpose of closer adjustment and to lock the mechanism in predetermined positions.

Another object is to provide either manual or pedal means of operating and adjusting the structure.

Other objects and advantages of this invention will become apparent in the specification and appended claims which taken in connection with the accompanying drawings form part of this application.

Now with reference to the drawings:

Fig. 6 is a side elevation of an embodiment of the invention operating on a straight rack;

Fig. 7 is an end elevation of same, partly in cross-section, showing the gears in locked position, and Fig. 8 is a similar view showing the means of disengaging the pinion from the rack.

In the several figures of the drawings like numerals indicate like or alternate parts, of which:

Figure 1:
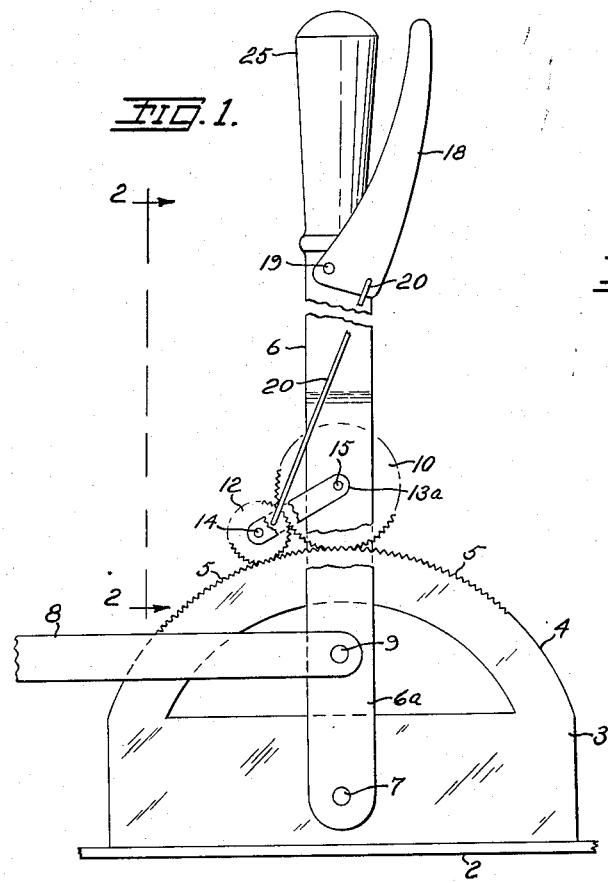
Fig. 1 is a side elevation of one embodiment of the invention showing the gears in locked position on an arcuate rack.
Figure 2:
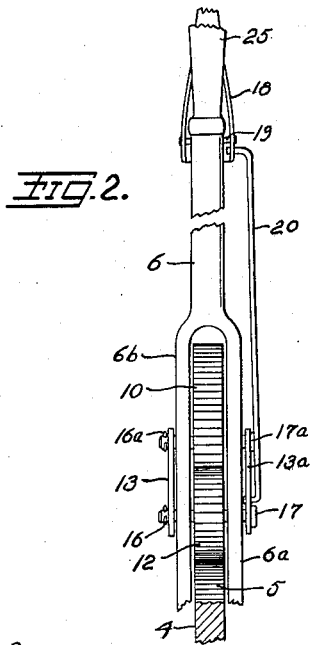
Fig. 2 is an end elevation of same, showing a portion in cross-section.

The numeral 2 represents a base on which is mounted a supporting plate 3, having an arcuate portion 4, on which pointed teeth 5 are formed for purposes to be hereinafter described.

Pivoted to supporting plate 3 is a bifurcated lever 6 operating on pin 7 which is affixed to supporting plate 3, while another lever 8, is pivoted to lever 6 at pivotal bearing 9. Lever 8 continues from bearing 9 to a brake that constitutes no part of the invention and consequently is not shown.

Figures 3, 4:
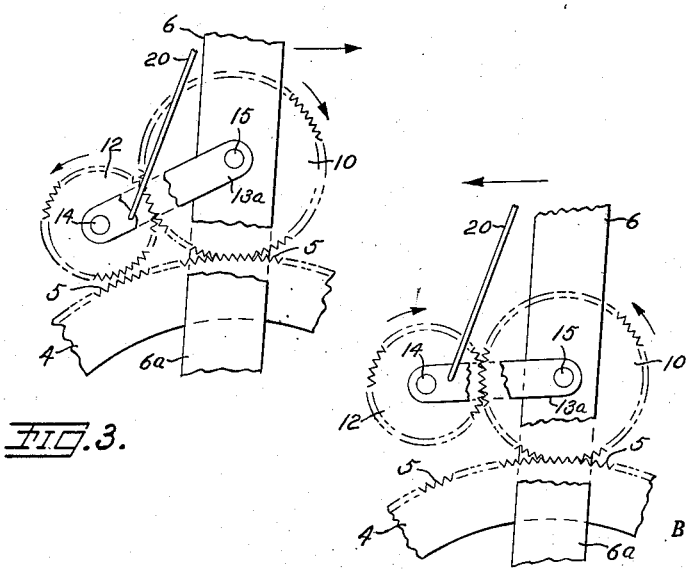
Fig. 3 is a fragmentary view of Fig. 1, showing the pinion out of engagement with the rack.
Fig. 4 is a similar view showing the pinion in another position relative to the gear during the operation of adjustment.

Mounted intermediate forks 6a and 6b of lever 6, is a circular gear 10 which normally intermeshes with teeth 5 on rack 4, while a pinion 12 engages gear 10 and teeth 5 when the mechanism is in locked position as shown in Fig. 1, and is out of engagement with teeth 5 as illustrated in Figs. 3 and 4, while adjustment is being made by the operator.

Pinion 12 is held in normal engagement with gear 10 by means of links 13 and 13a, said links being supported on bearing 14 which passes through the links and pinion 12, and by bearing 15, which passes through links 13—13a, forks 6a—6b and gear 10, while said bearings are prevented from lateral movement by cotter-pins 16—16a, which pass through one end of said bearings while the opposite ends of the bearings have shoulders 17—17a formed thereon to register with the outer surface of link 13a.

A hand-grip 18 is pivotally attached to lever 6 by means of trunnion 19 which passes through lever 6 and the hand-grip, while a rod 20 connects the hand-grip with link 13 for the purpose of engaging and releasing pinion 12 relative to teeth 5 on rack 4.

Figure 5:
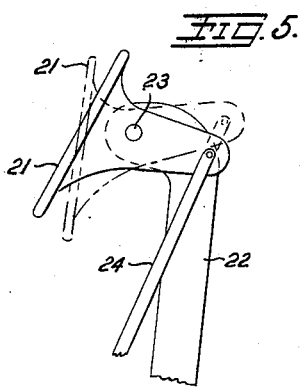
Fig. 5 shows an arrangement for pedal adjustment of the mechanism.

Figure 5 is an alternative of Figure 1, but is a foot-operated structure and comprises a pedal 21 pivoted to a lever 22 by means of pin 23, while a rod 24 is pivotally attached to one end of pedal 21 and functions as does rod 20 in Figures 1-2-3 and 4.

In order to operate the above described mechanisms, the operator releases pinion 12 from engagement with the teeth on rack 4 by a backward pull on hand-grip 18 which lifts pinion 12 into the position illustrated in Figure 3, while the operator adjusts gear 10 to any desired position relative to rack 4 by manipulating handle 25 of lever 6. When the adjustment is completed the operator then lowers pinion 12 into the engagement with teeth 5 of rack 4 which locks the brake into a predetermined position. In order to more firmly hold the brakes an additional pull is given to handle 25, and when the operator releases said handle, pinion 12 acts as a locking pawl to hold the brakes in a fixed position and prevent their accidental release.

Now referring to the embodiment shown in Figures 6-7 and 8, a modified form of the controlling mechanisms is illustrated, of which the numeral 26 shows a side-plate to which is affixed an arm 27, having pivotally attached thereto a link 28 suspended from shaft 29 which passes through said link, arm 27, gear 30, an additional link 31, and sideplate 26; said shaft 29 serves also as a bearing on which gear 30 rotates.

Passing through links 28 and 31, is a shaft 32 on which is rotatably mounted pinion 33 intermeshing with gear 30 for purposes to be more fully described.

The side-plate 26 has welded or otherwise affixed thereto a sleeve 34, with a cylindrical rack 35 mounted therein, while the teeth of gear 30 and pinion 33 intermesh with the teeth of said rack when the mechanism is in a locked position as shown in Figure 7, and out of engagement with the teeth on rack 35 while the operator is manipulating the mechanism by means of handle 36 of rack 35.

Rack 35 has a bar 37 welded thereto, which releases the pinion from rack 35 when the operator rotates the rack in sleeve 34, toward the direction of the arrow shown at the lower portion of Figure 8 until it registers with detent 38, which is an integral part of link 28.

In Figure 6 is shown a longitudinal slot 39 formed in sleeve 34 and terminating at shoulders 40—40a, which serve to limit the rotary movement of rack 35 and allow bar 37 to contact detent 38 for the purpose of moving pinion 33 out of contact with the teeth of rack 35.

In order to operate the embodiment shown in Figures 6–7 and 8, the handle 36 is used to rotate rack 35 in sleeve 34 until bar 37 contacts detent 38 and lifts pinion 33 out of mesh with the teeth of rack 35. The operator then slides rack 36 by means of handle 36 backwardly (in direction of arrow) to release the brake, and in order to lock the brake, pulls handle 36 in a counter direction, then rotates rack 35 toward shoulder 40, thus causing pinion 33 to again engage the teeth of rack 35 and hold the brake in a locked position.

The foregoing embodiments may be constructed of any suitable materials and made to any dimensions necessary for their manufacture, and while preferred forms have been illustrated and described, it is desired to include in this application all mechanical equivalents and substitutes that may be fairly considered to come within the scope and purview of the invention as defined in the appended claims.

Having described the invention so that others skilled in the art to which it appertains may be enabled to construct and use the same, what is claimed and desired to be secured by Letters Patent, is:

1. A device for releasably locking a control member for brakes or the like, comprising a support, a control member movably mounted on said support, two permanently intermeshed toothed elements respectively carried by said support and said control member, one of said toothed elements comprising a rack and the other of said toothed elements comprising a rotatably mounted gear enabling relative movement therebetween to permit movement of said control member relative to said support, a link pivotally mounted coaxially with said gear, a second gear journalled on said link in permanently meshing engagement with said first-mentioned gear and supported by said link for orbital movement about said first gear toward and from meshing engagement with said rack to lock said rack and first gear against relative movement when said second gear is in mesh with said rack, and a control element carried by said control member and having an operative connection with said link for swinging said link to disengage said second gear from said rack and enable relative movement between said first gear and rack to permit movement of said control member relative to said support.

2. A device as set forth in claim 1 wherein said first gear is pivotally mounted on said control member and movable therewith relative to said rack, and said control element comprises a lever pivotally mounted on said control member, and a second link connecting said lever and said first-mentioned gear-carrying link.

3. A device as set forth in claim 1 wherein said control member comprises a cylindrical body slidably and rotatively mounted on said support, said rack being carried by said control member body, and said control element comprising abutment means extending laterally of said control member body and operative upon rotation of said control member to swing said link and disengage said second gear from said rack and enable longitudinal movement of said rack and control member relative to said first gear and support.

4. A device for releasably locking a pivoted control lever selectively along a quadrant rack, a first gear journalled on said lever in permanently meshing engagement with said rack, a link pivotally mounted on said lever coaxially with said first gear, a second gear journalled on said link in permanently meshing engagement with said first gear and carried by said link for orbital movement about said first gear toward and from said rack, a manually operable lever pivotally mounted on said control lever, and a second link connected between said manually operable lever and said first mentioned link for swinging said first link upon actuation of said manually operable lever to disengage said second gear from said rack and permit movement of said first gear and control lever relative to said rack.

5. A device for releasably locking a control member for brakes or the like, comprising a support including a sleeve, a control member having a cylindrical body slidably and rotatively mounted in said sleeve, a rack on said body portion, a first gear journalled on said support in permanently meshing relation with said rack, a link pivotally mounted on said support coaxially with said first gear, a second gear journalled on said link in permanently meshing engagement with said first gear and carried by said link for orbital movement about said first gear toward and from said rack, and an elongated abutment longitudinally on said cylindrical body and engageable with said link upon rotation of said control member to swing said link and disengage said second gear from said rack to permit longitudinal movement of said control member, said sleeve having an elongated slot to accommodate said abutment.

HAROLD REX GARDNER.

References Cited in the file of this patent

UNITED STATES PATENTS

| Number | Name | Date |
| --- | --- | --- |
| 246,269 | Yeagley | Aug. 23, 1881 |
| 357,308 | Cushing | Feb. 8, 1887 |
| 669,475 | Bullard | Mar. 5, 1901 |
| 1,968,159 | Nickliss | July 31, 1934 |
| 2,170,900 | Jandus et al. | Aug. 29, 1939 |
| 2,271,799 | McCarthy | Feb. 3, 1942 |
| 2,420,555 | Mott | May 13, 1947 |